(12) United States Patent
Gaudet

(10) Patent No.: US 9,408,428 B2
(45) Date of Patent: Aug. 9, 2016

(54) FORCE LIMITING DEVICE

(75) Inventor: Martin Gaudet, Bainsville (CA)

(73) Assignee: GAUDET MACHINE WORKS INC., Bainsville, ON (CA)

(*) Notice: Subject to any disclaimer, the term of this patent is extended or adjusted under 35 U.S.C. 154(b) by 1010 days.

(21) Appl. No.: 13/332,610

(22) Filed: Dec. 21, 2011

(65) Prior Publication Data

US 2012/0180200 A1 Jul. 19, 2012

Related U.S. Application Data

(60) Provisional application No. 61/426,822, filed on Dec. 23, 2010, provisional application No. 61/432,783, filed on Jan. 14, 2011.

(51) Int. Cl.
F16F 5/00 (2006.01)
A42B 3/12 (2006.01)
A47B 91/04 (2006.01)
B25D 1/12 (2006.01)
F15B 15/22 (2006.01)
F16F 15/023 (2006.01)

(52) U.S. Cl.
CPC .............. A42B 3/121 (2013.01); A47B 91/04 (2013.01); B25D 1/12 (2013.01); F15B 15/226 (2013.01); F16F 15/0237 (2013.01)

(58) Field of Classification Search
USPC .................. 267/141.1–141.6, 122, 140.4
See application file for complete search history.

(56) References Cited

U.S. PATENT DOCUMENTS

| 2,465,429 | A | | 3/1949 | Bryson | |
|---|---|---|---|---|---|
| 2,471,294 | A | * | 5/1949 | Watts | 267/64.26 |
| 2,483,430 | A | * | 10/1949 | Pierce | 267/34 |
| 2,587,016 | A | * | 2/1952 | Watts | B64C 25/60 |
| | | | | | 138/43 |
| 2,916,307 | A | * | 12/1959 | Peters | 285/9.2 |
| 3,744,599 | A | * | 7/1973 | Tresch et al. | 188/298 |
| 3,856,242 | A | * | 12/1974 | Cook | F16F 15/06 |
| | | | | | 248/548 |
| 3,980,016 | A | * | 9/1976 | Taylor | B30B 15/061 |
| | | | | | 100/295 |
| 4,186,569 | A | * | 2/1980 | Aumann | 464/20 |
| 4,276,947 | A | * | 7/1981 | Hebel | F16F 1/32 |
| | | | | | 175/321 |
| 4,523,664 | A | | 6/1985 | Soubry et al. | |
| 4,558,628 | A | | 12/1985 | Bosshard | |
| 4,612,429 | A | | 9/1986 | Milianowicz | |
| 4,765,600 | A | * | 8/1988 | Hartel | 267/122 |
| 4,773,632 | A | | 9/1988 | Hartel | |
| 5,286,013 | A | * | 2/1994 | Seymour et al. | 267/220 |

(Continued)

FOREIGN PATENT DOCUMENTS

| EP | 1855000 | 11/2007 |
|---|---|---|
| JP | 60065925 | 4/1985 |
| JP | 60125433 | 7/1985 |

Primary Examiner — Christopher Schwartz
(74) Attorney, Agent, or Firm — Norton Rose Fulbright Canada LLP

(57) ABSTRACT

A force limiting device comprises a housing defining an axially extending chamber containing a working fluid. A force transmitting member may be mounted for linear reciprocable movement inside the chamber under the action of external loads. An axial array of plates is floatingly disposed in the chamber between the force transmitting member and an end wall of the chamber. At rest, each plate is spaced from an adjacent plate by a gap occupied by the working fluid. When the force transmitting member is displaced towards the array of plates, the fluid in the chamber causes the plates to be successively pushed against each other, thereby causing some of the fluid to be squeezed out from between the plates.

10 Claims, 12 Drawing Sheets

(56) References Cited

U.S. PATENT DOCUMENTS

| | | |
|---|---|---|
| 6,095,923 A | 8/2000 | Kageyama |
| 6,250,441 B1 | 6/2001 | Shimoda |
| 2004/0173422 A1 | 9/2004 | Deshmukh et al. |
| 2007/0193839 A1 * | 8/2007 | Nakajima et al. .......... 188/267.2 |

* cited by examiner

FORCE LIMITING DEVICE

CROSS-REFERENCE TO RELATED APPLICATIONS

The present application claims priority on U.S. Provisional Application No. 61/426,822 filed on Dec. 23, 2010, and 61/432,783 filed on Jan. 14, 2011 the content of which is incorporated herein by reference.

TECHNICAL FIELD

The application relates generally to force limiting devices, such as dampers or hydraulic cushions, suited for absorbing or dissipating energy through the flow of a fluid.

BACKGROUND ART

Energy absorbing devices are used in various applications. Over the years, various types of such devices have been developed. However, it has always been challenging to design a device that has the ability of efficiently dissipating high frequency, high force and low amplitude oscillations of short duration. Also, commercially available energy absorbing devices have a relatively limited range of applicability.

There thus remains room for improvements.

SUMMARY

In accordance with a first aspect of the present application, there is provided a force limiting device comprising at least a first set of parallel plates distributed along an axis and floatingly received in a chamber containing a working fluid, each plate having a working face generally normal to said axis, said working face having an effective surface area, each plate at rest being axially spaced from an adjacent plate by an inter-plate gap filled by the working fluid, each individual plate forming a piston for working on the volume of the working fluid between it and the next plate, the plates being axially movable towards and away from each other, at least a portion of the working fluid being squeezed out from between the plates in response to an axial compressive load transferred to the set of plates.

In accordance with a second aspect, there is provided a hydraulic cushion comprising a housing defining an axially extending chamber filled with a working fluid, an axial array of plates floatingly disposed in the chamber, at rest each plate being spaced from an adjacent plate by a gap occupied by the working fluid, when subject to a compressive load, the relative movement of the plates causing the viscous fluid to be at least partly squeezed out from between the plates.

In accordance with a third aspect, there is provided a hydraulic cushion comprising a chamber containing a working fluid, a force transmitting member axially reciprocable within the chamber, said force transmitting member having a working surface moving against fluid pressure in the chamber, and a set of damping plates floatingly mounted in the chamber between the working surface of the working member and an opposed end wall of the chamber, at rest the plates being spaced-apart by inter-plate gaps, said inter-plate gaps being occupied by the working fluid, the working fluid being squeezed out from between the plates as the force transmitting member travels towards the set of plates under the application of an external load.

Further details of these and other aspects of the present invention will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
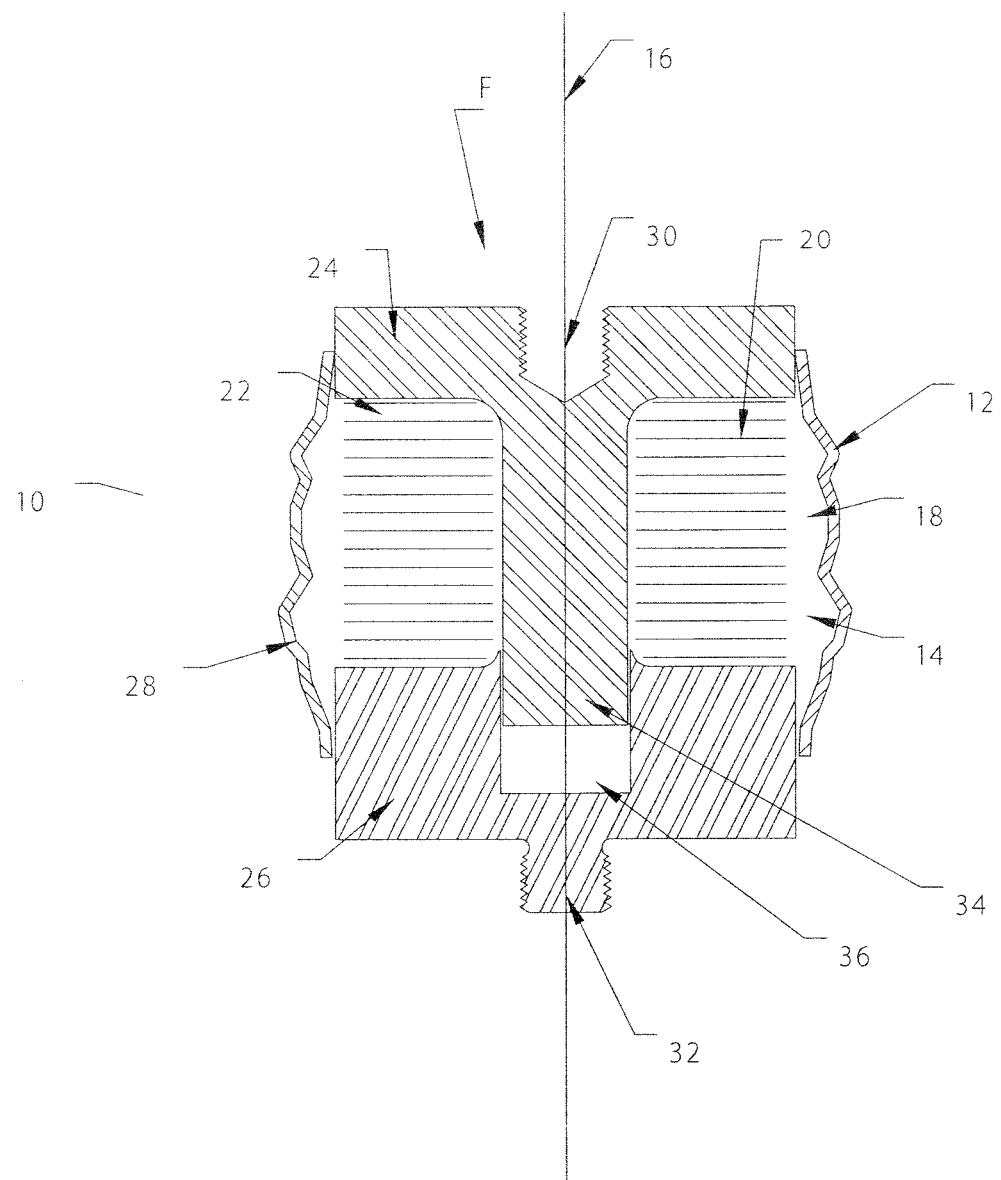
FIG. 1 is a schematic cross-section view of a single-acting variant of a hydraulic damper comprising a set of damping plates.

FIG. 1 illustrates a force limiting device which may be provided in the form of a hydraulic damper 10 comprising a housing 12 defining a hermetic chamber 14 having an axis 16. The chamber 14 contains a working fluid 18 and a stack or set of parallel plates 20 disposed generally normal to the axis 16. The plates 20 are "floatingly" received in the chamber 14 and are movable relative to each other along axis 16. At rest, each plate 20 is separated from the adjacent plates 20 by an inter-plate gap 22 occupied by the working fluid 18. The capillary action of the fluid 18 contributes to maintain the plates 20 axially spaced-apart from each other.

Figure 2:
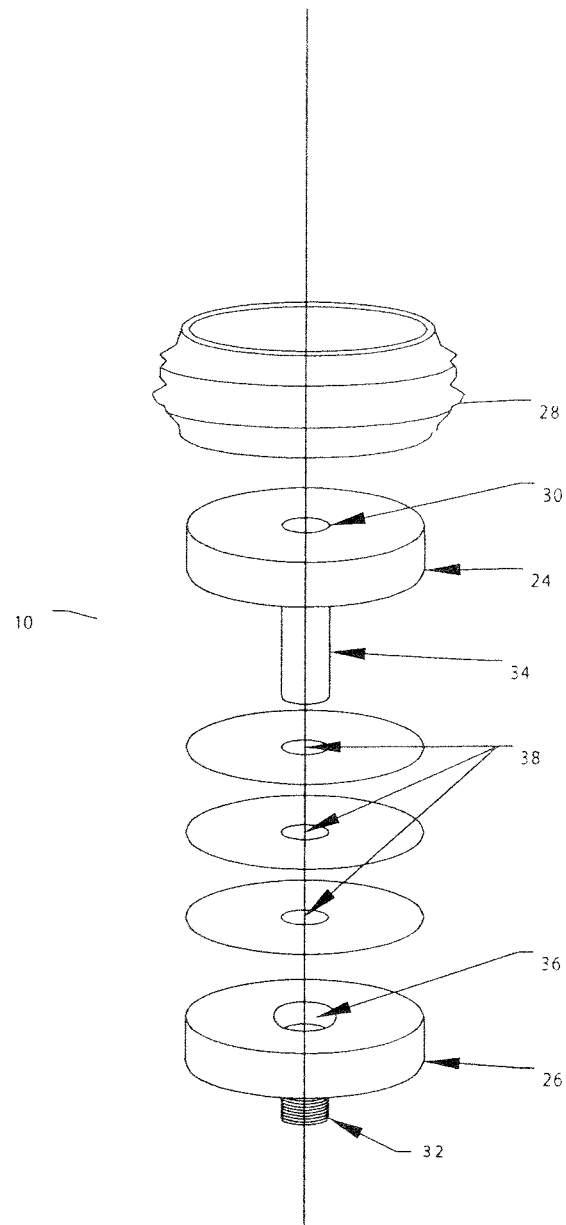
FIG. 2 is a schematic exploded view of the damper shown in FIG. 1.

As shown in FIGS. 1 and 2, the housing 12 may comprise first and second axially opposed counter-acting members 24 and 26 joined by an elastomeric boot 28. The first and second members 24 and 26 cooperate together with the elastomeric boot 28 to define the hermetic chamber 14. The elastomeric boot 28 allows the first member 24 to move towards and away from the second member 26 under the action of external forces F. Alternatively, the first member 24 could be slidably received in a tube/cylinder axially extending from the second member 26 or vice versa. The first and second members 24 and 26 are provided with respective mounting structures for allowing mounting thereof between two parts of a structure requiring damping. For instance, damper 10 could be interposed between the frame and the engine of motorized equipment, or integrated into aerospace components to dampen vibrations. In the illustrated example, the first member 24 has a central threaded hole 30, whereas the second member 26 has a central threaded stud portion 32. It is understood that any other suitable attaching/mounting structure could be provided.

As shown in FIGS. 1 and 2, the first member 24 may be provided on an inwardly facing surface thereof with an axially extending central rod or shaft 34. The distal end portion of the shaft 34 is adapted to be slidably received in a corresponding central guiding recess 36 defined in the inwardly facing surface of the second member 26. The engagement of the shaft 34 in recess 36 ensures proper axial alignment of the first and second end members 24 and 26 at all times. In other words the shaft and recess arrangement axially guides the relative movement between the first and second members 24 and 26.

As shown in FIG. 2, each plate 20 may be provided with a central hole 38 for allowing the plates 20 to be slidably/loosely mounted on the shaft 34 for relative axial movement with respect thereto. The plates 20 are prevented from axially sliding off of the shaft 34 by virtue of the engagement of the distal end portion of the shaft 34 in the central guiding recess 36; the inner face of the second member 26 acting as a stopper for the plates 20. It is understood that other suitable mechanisms could be used to prevent the plates 20 from sliding off the shaft 34. According to an alternate embodiment, the plates 20 could be loosely confined/guided in a rigid tube (not shown) instead of being fitted on a central shaft. The two counter-acting members 24 and 26 could be prevented from escaping each other axially by the following: The shaft 34 could be hollow and have a slot cut into its length. Into the hollow shaft, and co-axially to it would enter a pin protruding from the inner face of the second member 26, and be prevented from coming out of engagement from shaft 34 by a roll pin installed through the end of the pin protruding from member 26, and sliding in the slot.

Figure 3A:
FIG. 3a is a schematic perspective view of a first type of plate that may form part of the set of damping plates of the damper shown in FIG. 1.
Figure 3B:
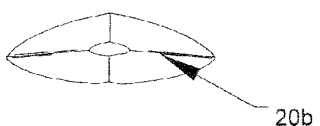
FIGS. 3b and 3c are respectively schematic oblique and side views illustrating a second type of plates that may form part of the damping plates of the damper shown in FIG. 1.
Figure 3C:
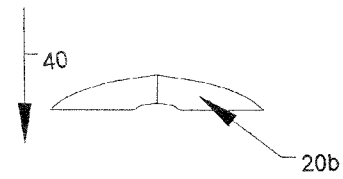

As shown in FIGS. 2, 3a, 3b and 3c, the plates 20 may have a circular shape. The outer circumference of the plates 20 generally corresponds to that of the opposed inner faces of the first and second members 24 and 26. The plates 20 may be made out of metallic material. However, it is understood that other suitable materials could be used as well. As shown in FIGS. 3a, 3b and 3c, the set of plates 20 may include plates having two different shapes and configurations. A first category of plates 20a (FIG. 3a) may be flat while a second category of plates 20b (FIGS. 3a and 3b) may be creased, wrinkled, cupped, distorted or formed in such a way as to deform the plate permanently in section across the largest plane. The deformation is induced to provide a spring effect in the axial direction 40 (FIG. 3c). The first and second categories/types of plates 20a, 20b may be alternately disposed in the set of plates shown in FIG. 1. Accordingly every other plate would belong to the second category of plates.

The springiness of the plates 20b separates the alternately stacked flat and sprung plates 20a and 20b through virtue of the inherently contained elastic deformation of the non-flat plates 20b. The resulting inter-plate gaps 22 promote the ingress of the working fluid 18 to provide a film of roughly equal thickness between each pair of adjacent plates 20 through capillary action. It is understood that the conditions required to be dampened, the viscosity of the fluid, the volume of working fluid confined between each plate 20 in relation to the escape area at rest, the input force, the input velocity, and the number of working fluid interstices, all contribute to the behavior of the dampening. However, in general, a film thickness of not more than 0.050 inches per gap, and more typically 0.010 inches per gap is adequate.

According to another embodiment, all the plates 20 could be flat, and the separation of the plates could be achieved by springs (not shown), or suitable porous media disc or elastomeric separators interspersed between the plates 20, or any device which would promote the separation of the plates 20 to accept the ingress of the working fluid to the required film thickness between the plates 20. For instance, separators could be made in the shape of starfish with a hole to guide the lot on the shaft 34. The radial slots provided by spaces between the fingers would promote the capillary refilling of the spaces 22. Cloth or some other similar porous material might also be used to promote wicking of the fluid back between the plates 20.

Allotment of space either radially outwardly of the plate circumference, or inwardly through the plates 20 by virtue of perforations (not shown) in each plate 20 or through a center hole defined therethrough, is provided to allow egress of the working fluid 18 as the plates 20 are forced together under the action of the movable first force transmitting member 24 on the working fluid 18. According to the embodiment illustrated in FIG. 1, when subject to a compression load, the working fluid 18 is squeezed out from between the plates 20 in a radially outward direction and the volume of fluid displaced is stored by radial inflation of the elastomeric boot 28. However, as mentioned above, it is understood that the working fluid 18 could as well be squeezed out from between the plates 20 in a generally axial direction through perforations defined in the plates 20.

The working fluid 18 may be provided in the form of mineral oil. However, it is understood that other hydraulic or viscous fluids could be used as well. For instance, any of the following fluids might be suitable, having considered other aspects of construction, namely plate area, number of plates, thickness of the film at rest, required dampening force and/or travel duration: Glycerine, glycol, grease, vegetable oil, emulsions of water and oil, water-alcohol. This is not intended to constitute an exhaustive list. Gases could also be used for certain applications.

It is understood that the dampening characteristics vary as a function of the viscosity of the fluid, due to the conversion of the input energy to heat through molecular friction of the fluid being forced out laterally along the face of the plates 20. Furthermore, as the input velocity increases, or the inter-plate space decreases, the rate of conversion is higher due to the higher molecular shear acting on the fluid. Intuitively, more viscous fluids would provide greater force dampening at lower velocities. Mineral oil is chosen principally for its appropriate viscous properties and is given due consideration for thermal viscosity stability, chemical stability, chemical compatibility, corrosion inhibition, extreme pressure lubrication characteristics, and others. The volume of working fluid 18 is generally, but not necessarily, free of dissolved gasses, including air. Once loaded in the housing 12, the working fluid 18 is sealed from the atmosphere and prevented from acquiring atmospheric gasses by the hermetic chamber 14 formed by the elastomeric boot 28 and the end members 24 and 26. The prevention of the re-acquisition of atmospheric gasses into the degassed fluid by the hermetic elastomeric boot 28 aids in the prevention of the formation of cavitations bubbles. This would promote the flatter dynamic response through all operating conditions by assuring that the fluid's flow characteristics from the inter-plate spaces 22 would remain constant.

In use, the damper will typically be mounted between a fixed object and an object that is movable with respect to the fixed object. For instance, the first member 24 could be connected to the movable object, while the second member 26 is connected to the fixed object. When a force or load F is applied on the first member 24, which in this case acts as working or force transmitting member, the same will be axially displaced towards the second member 26 (i.e. the reaction member) against the working fluid 18. The action of the first member 24 on the working fluid 18 will cause the plates 20 to be axially pushed against each other from top to bottom. Since each plate 20 has little mass in relation to the input force, the response to input forces is quasi-instantaneous through the stack of plates 20, where each plate will seek to maintain a hydraulic pressure balance between itself and its two neighbours. The thickness of the fluid film is expected to be reduced in thickness equally between all plates generally simultaneously.

As a result, the working fluid 18 between each pair of adjacent plates 20 will be squeezed out from between the plates 20. The volume of working fluid that is displaced as a result of the collapsing of the plates 20 will flow radially outwardly from the periphery of the plates and stored by the inflation of the boot 28.

As can be appreciated from the foregoing, when a load is applied to the cushion or unit 10 from an at rest position, the plates 20 are forced closer together. This reduction in distance causes the fluid 18 to be forced out from each inter-plate space. The reaction force resisting the collapse of each fluid film (e.g. oil film) is produced by the volume of fluid between each plate being forced to flow radially out of the relatively small escape area. The escape area is defined by the circumference of each plate multiplied by the escape thickness. The area of each plate face defines the active surface against which the hydrostatic forces will bear to resist the collapse of the cushion. The reaction force is defined by the surface area of one plate multiplied by the average hydro-dynamic pressure set up by the fluid flow escaping the plate gap. The hydraulic pressure on the fluid near the escape area is less than that on the fluid further into the plate, due to the pyramiding effect of the resistance to flow. The forces acting on each plate 20 is on a plane parallel to the thickness of each plate, and is induced by the friction of the oil sliding along the plate surface. Each plate is loaded in tension parallel to the face. Since all plates 20 are free to move independently of each other, they will seek to balance themselves against each other in a direction perpendicular to the face of each plate 20. Thus, the reaction force of any one will fairly represent the force on any other. The force input into the cushion will bear ultimately on the inner faces of the two counter-acting members 24 and 26. Only these two are constructed to withstand the sum of the mechanical forces input into the cushion. If the collapse velocity is constant, the reaction force will increase exponentially as the cushion is collapsed due to the ever decreasing escape area offered to the fluid versus the same pumping area. If the cushion is collapsed with a constant force, the velocity will slow progressively until there is contact between all plates. This velocity-dependent self-compensating characteristic makes the graph of force versus time of a decelerating load tend to have a vertical entry force, a flat-topped deceleration profile, and a tapering finish, until the input force is equal to the inherent spring force of each plate, or the point where the plates touch completely. The force multiplied by the distance traveled will dictate the amount of energy converted to heat through molecular friction of the fluid.

The ratio of the effective area of the working face of each plate 18 versus the fluid escape area as measured along the circumference of the plates 20 multiplied by the thickness of the oil film between the plates 20 provides a non-linear increasing reflected force damping behaviour of the hydraulic damper as the film thickness collapses.

The dampening characteristics are self-compensating by virtue of the relation between the plate effective surface area and the escape area ratio. If the entry velocity is high from an at rest position, the stroke distance available is large and provides time to decelerate the load. If the entry velocity is low, the damper 10 acts soft due to the decreasing force per unit area acting to force the working fluid 18 out of the inter-plate gaps 22. As the stack of plates 18 collapsed and the load velocity slows down, the thickness of each oil film is less, and therefore the ratio of the pumping area (i.e. the effective surface area of the plates) versus the escape area of the confined oil is correspondingly higher. This higher reflected force at differing the reduced thicknesses causes the damper 10 to have a nearly flat reflected load curve in decelerating kinetic masses.

The kinetic energy input into the damper 10 is converted to heat by virtue of the molecular friction of the inordinately large effective surface area provided by the sum of the effective surface area of all the plates 20, when forced to bear in friction with the relatively thin film of working fluid 18 moving laterally across the compression faces of the plates 20. Indeed, the sum of the effective surface area of all the plates 20 provides for a total effective surface area which is significantly larger than the effective surface area of a conventional hydraulic damper having a cylinder with a sliding piston inside. In other words, the set of plates 20 have a cumulative damping effect.

The relatively large effective surface area of the plates 20 provides a relatively high reaction force, which is generated perpendicularly to the compression or working face of the plates, while keeping the force per unit area acting on any of the internal working parts to a relatively low value. Large forces can be attenuated in small package due to the nature of the operation of the unit, in that neither seals nor pressure vessels are required to contain the hydrostatic forces found in conventional piston and cylinder dampers. Instead, the forces are contained between balanced working surfaces provided by the plates 20 and the end members 24 and 26.

Contrary to conventional cylinder and piston type dampers which require a seal between the piston and the cylinder, the damper 10 does not require any high pressure seal and is substantially friction free, which makes it reliable. The absence of static seal friction makes the damper 10 more sensitive/responsive to small variations in input loads. The damper 10 is also advantageous in that the reflected load characteristic as seen through the damper converts much of the input energy to heat, and spreads the remaining force over time. This phase shift greatly reduces the effects of transient force peaks, thus protecting down-line equipment from high intensity short duration overloads.

Figure 4:
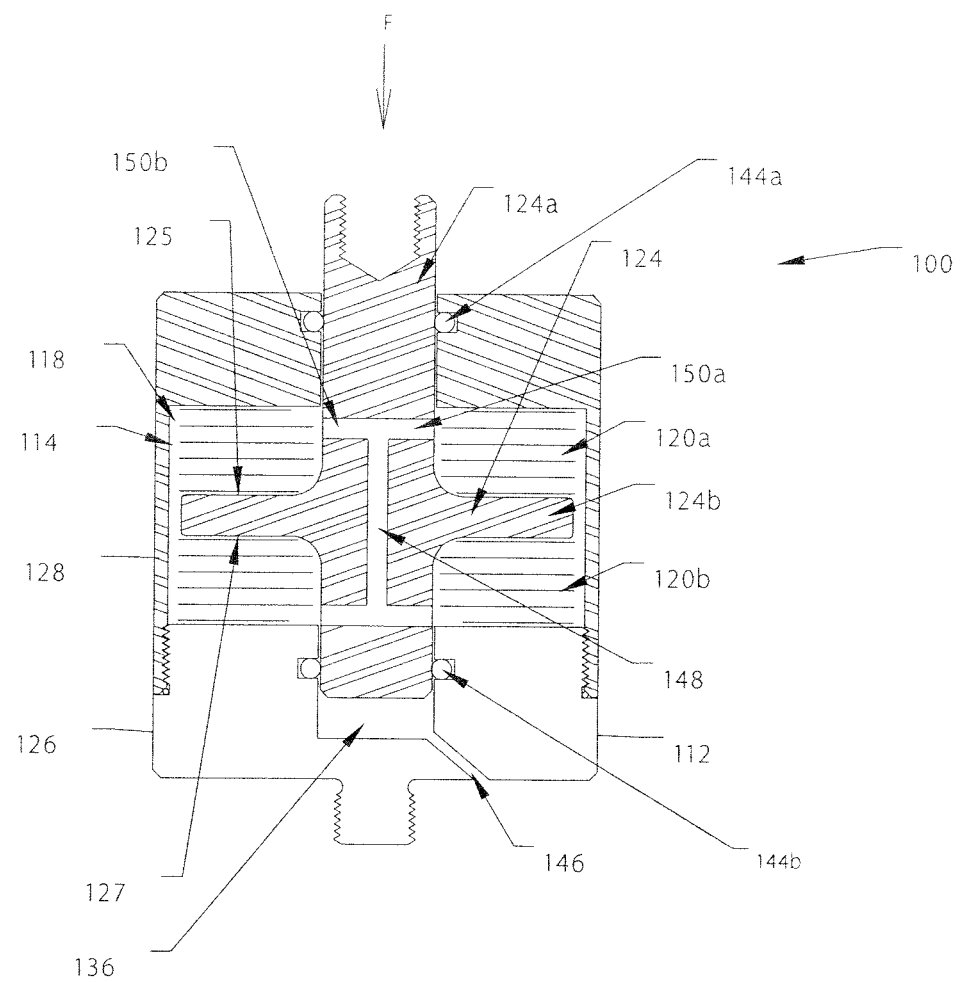
FIG. 4 is a schematic cross-section view of a double-acting variant of a hydraulic damper in accordance with another embodiment of the present invention.

FIG. 4 illustrates how two sets of damping plates 120a and 120b can be mounted back to back in one unit 100 to provide a double-acting damper. According to this embodiment, the housing 112 may be composed of a cylinder 128 having an open end sealingly closed by a cap 126 to form a chamber 114 filled with the working fluid 118. As shown in FIG. 4, the cap 126 may be threadably mounted or otherwise suitably secured to the open end of the cylinder 128. A spool 124 including a shaft 124a and a central piston head in the form of an annular flange 124b is mounted for reciprocal movement inside the cylinder 128. The annular flange 124b provides two opposed working surfaces 125 and 127 so that bi-directional loads input into the unit would be born against the housing 112 through the two sets of damping plates 120a, 120b. The circumference of the annular flange 124b may be less than the inside diameter of the cylinder 128 to allow the working fluid 118 to pass from one side of the flange 124b to the opposed side thereof. Alternatively, this may be accomplished by providing holes through the flange 124b. A first end of the shaft 124a extends outside of the housing 112 through a central hole defined in the closed end wall of the cylinder 128. The first end of the shaft 124a is adapted to be connected to a surrounding structure requiring damping. A first seal 144a may be mounted in the central hole to prevent the working fluid 118 from leaking out of the chamber 114. The second end of the shaft 124a of the spool 124 is slidably received in a corresponding central recess 136 defined in the inwardly facing surface of the cap 126. A second seal 144b may be provided in the recess 136 to prevent the working fluid 118 from flowing around the shaft 124a into the recess 136. A vent 146 is defined in the cap 126 for allowing the air trapped in the recess 136 behind the second end of the shaft 124a to communicate to atmospheric pressure. To keep the seal pressure at relatively low values, a cross-bleed flow passage 148 may be defined centrally axially through the shaft 124a with a series of radial holes 150a, 150b at or near the seal points. In this way, some of the working fluid 118 at a working-end seal can bleed back through the shaft 124a to the non-working end. Since the inlet of the cross-bleed passage 148 is at or near the seals 144a, 144b, the hydrostatic pressure required to force the working fluid 118 radially out from between the damping plates 120a, 120b is not compromised, and each plate stack behaves normally.

The first set of damping plates 120a is loosely mounted on the shaft 124a between the closed end wall of the cylinder and the annular flange 124b of the spool 124. The second set of plates 120b is loosely mounted on the shaft 124b between annular flange 124b and the cap 126. The plates of both sets are free to axially move relative to the shaft 124a. Each plate 120a, 120b is spaced from an adjacent plate by a film of working fluid 118. When the plates of a given set are forced together, the working fluid between the plates will be squeezed out radially outwardly from between the plates and allowed to flow to the other set of plates on the other side of the flange 124b. For instance, if an axial force F' is applied on the spool 124, the working face 127 will move the working fluid located between the flange 124 and the cap 126, thereby forcing the stack of plates 120b to collapse. The working fluid 118 squeezed out from the stack of plates 120b will flow past the outer circumference of the flange 124b to the stack of plates 120a located on the other side of the flange 124b. The working fluid flowing to the set of plates 120a will cause the plates 120a to be spread further apart. The pressure differential between the compression of plate stack 120b and the expansion of plate stack 120a will cause the fluid to flow into the voids between plates 120a. Capillary action which permits the fluid to flow into the voids will be aided by the inherent spring force in whichever plate 20b is deformed. In time, the capillary action and the inherent spring force will cause the oil thickness between each plate to be equal in thickness throughout plate stack 120a.

The need for an elastomeric expansion chamber in this second embodiment is obviated by the equal displacement of either end of the spool 124. Since the internal volume of the unit remains the same regardless of the position of the spool owing to the double-rod arrangement, the fluid displaced from plate stack 120b is hydrostatically compelled to fill the void in plate stack 120a.

Figure 5:
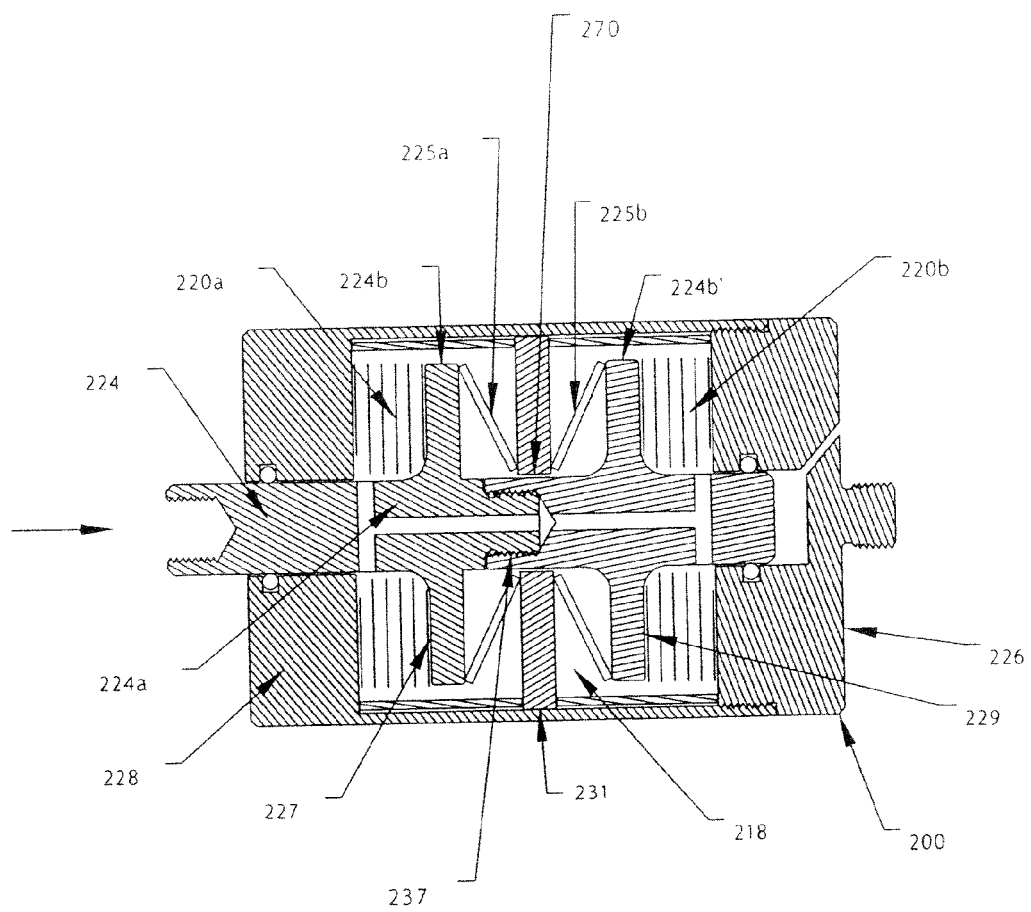
FIG. 5 is a schematic cross-section view of an internally pre-loaded double-acting variant of a hydraulic damper in accordance with a further embodiment of the present invention.

The variant of internally or externally mounted springs to accomplish a pre-load condition can be achieved in a variety of ways. FIG. 5 illustrates one possible configuration of an internally pre-loaded double acting unit 200. In the embodiment of FIG. 5, a set of internal springs 225a and 225b tuned to the lower threshold load are mounted to bear against a double flanged spool 224 and a central partitioning disc 231. The spool 224 has first and second flanges 224b and 224b'. The partitioning disc 231 is mounted between the first and second flanges 224b and 224b'. The first spring 225a extends between the first flange 224b and the partitioning disc 231 to bias the spool 224 toward the left-hand side in FIG. 5, while the second spring 225b extends between the partitioning disc 231 and the second flange 224b' to bias the spool 224 towards the right-hand side in FIG. 5. The first flange 224b has a working surface 227 facing the end wall of the cylinder 228. Likewise, the second flange 224b' has a working surface 229 facing the cap 226 closing the open end of the cylinder 228. A first set of damping plates 220a is loosely mounted on the spool shaft 224a between the working surface 227 and the end wall of the cylinder 228. A second set of damping plates 220b is loosely mounted on the spool shaft 224a between the working surface 229 and the cap 226. The spaces between adjacent plates (i.e. the inter-plate gaps) are filled by the working liquid 218 just like in the other embodiments. The partitioning disc 231 is held in the middle of the chamber 214 between tubular spacers 264. The cap 226 axially retains the spacers 264 and, thus, the partitioning disc 231 in position in the chamber 214. With the springs 225a and 225b in slight pretension, any external load acting axially on the spool shaft 224a would have to overcome the tension of the springs 225a and 225b before causing the space confining the set of plates 220a, 220b to change. For instance, to move the spool 224 to the right in FIG. 5, the biasing force of the first spring 225a has first to be overcome. Then and only then, the spool 224 can be moved to the right to cause the second stack of plates 220b to be pressed against the cap 226, thereby causing the working fluid to be squeezed out from between the plates 220b. The working fluid displaced by the motion of the working face 227 of the second flange 224b' is allowed to flow to the idle plate pack 220a through axially extending passages 270 defined in the partition disc 231.

The spool 224 is assembled generally, but not necessarily, by a central screwed shaft connection 237 between the flanges 224b and 224b', thereby allowing the assembly of the partition disc 231, the two springs 225a and 225b, and the spool halves inside housing 228. The opposite faces are engaged when the spool 224 is moved to the left. Springs of different strengths can be employed to have different breakaway forces in extension or compression of the unit. Since the springs 225a and 225b hold the spool 224 centered in the housing and motion is prevented until the spring force is overcome by an input force, the unit can be used to act as a breakaway overload when the unit is used in line in a position-dependant mounting. This variant could be built as a single or double acting.

Figure 6:
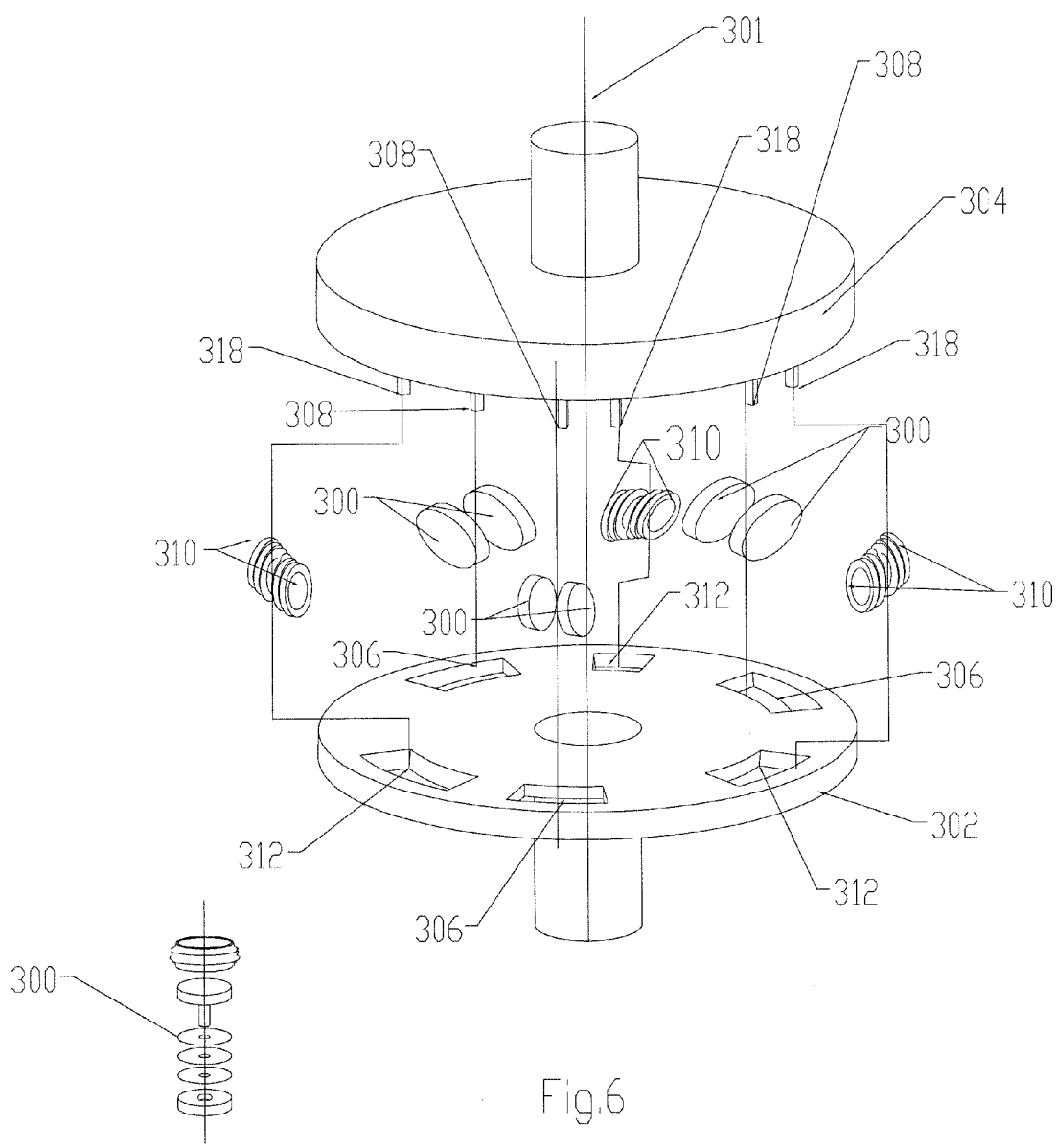
FIG. 6 is a schematic exploded perspective view of a torsional damper mounting arrangement in accordance with a still further embodiment of the present invention.
Figure 7:
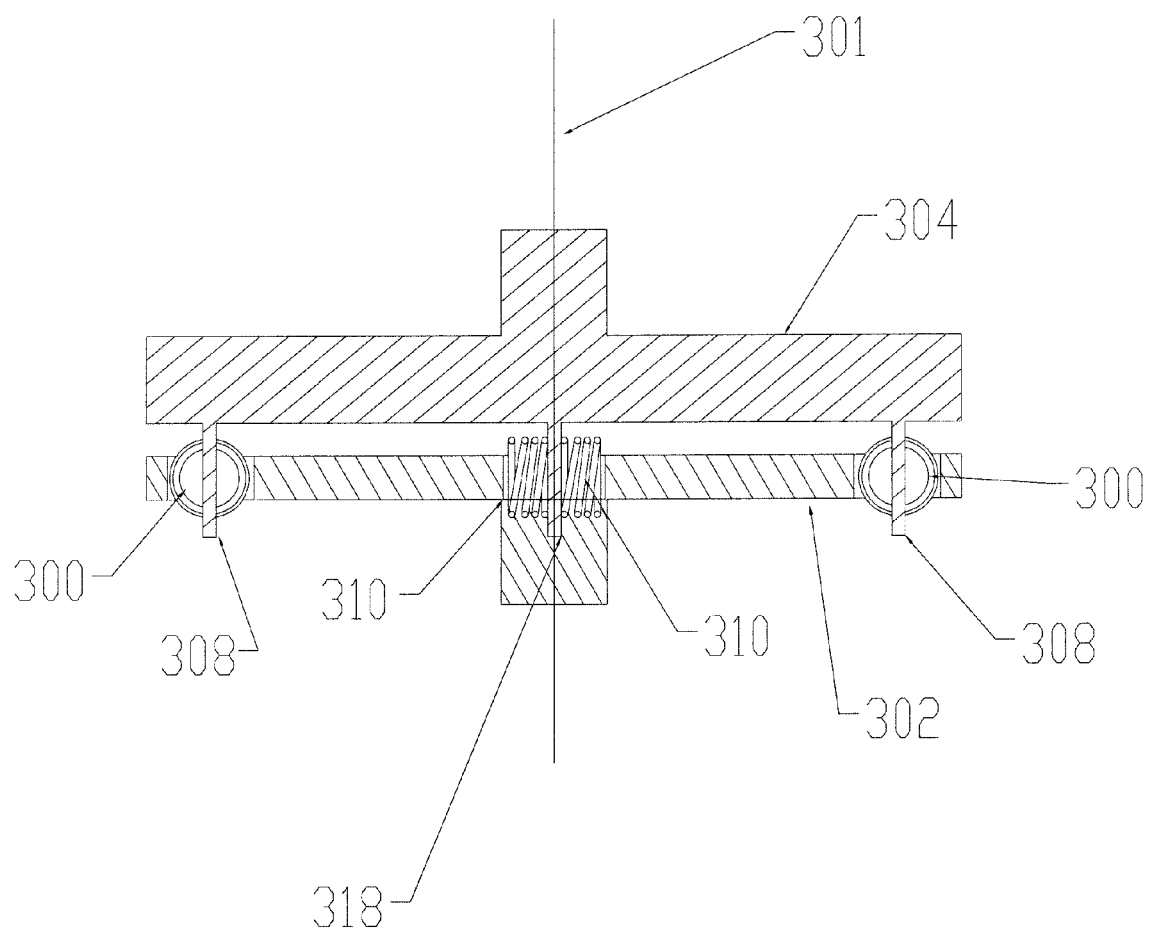
FIG. 7 is a schematic cross-section view of the torsional damper mounting arrangement shown in FIG. 6.

As shown in FIGS. 6 and 7, hydraulic damping units 300, which may each be similar to unit 10 shown in FIGS. 1 and 2, may also be used to provide torsional damping. The torsional damping assembly shown in FIGS. 6 and 7 may, for instance, comprise a pair of discs 302 and 304 drivingly connected for joint rotation about an axis 301. The first disc 302 has a series of circumferentially spaced-apart slots 306 defined therein. Each slot 306 extends along an arc of circle. The second disc 304 has a first series of circumferentially spaced-apart fingers 308 extending perpendicularly from one face thereof for engagement in the slots 306 of the first disc 302. A pair of individual damping units 300 is mounted at opposed ends of each slot 306 with one finger 308 engaged therebetween. A second series of circumferentially spaced-apart slots 312 is defined in the disc 302. The second set of slots 312 is angularly offset relative to the first set of slots 306. As shown in FIG. 6, each slot 312 is disposed between two slots 306. In addition to the damping units 300, a pair of coil springs 310 or the like may be mounted in each slot 312. A second set of circumferentially spaced-apart fingers 312 projects from disc 304 for engagement between each pair of springs 310. The springs 310 provide a lower threshold breakaway force. The springs 310 will provide the torque characteristic for normal drive force, and variations in driving torque between the discs 302 and 304 which exceeds the spring force would be dissipated into the damping units 300.

Figure 8:
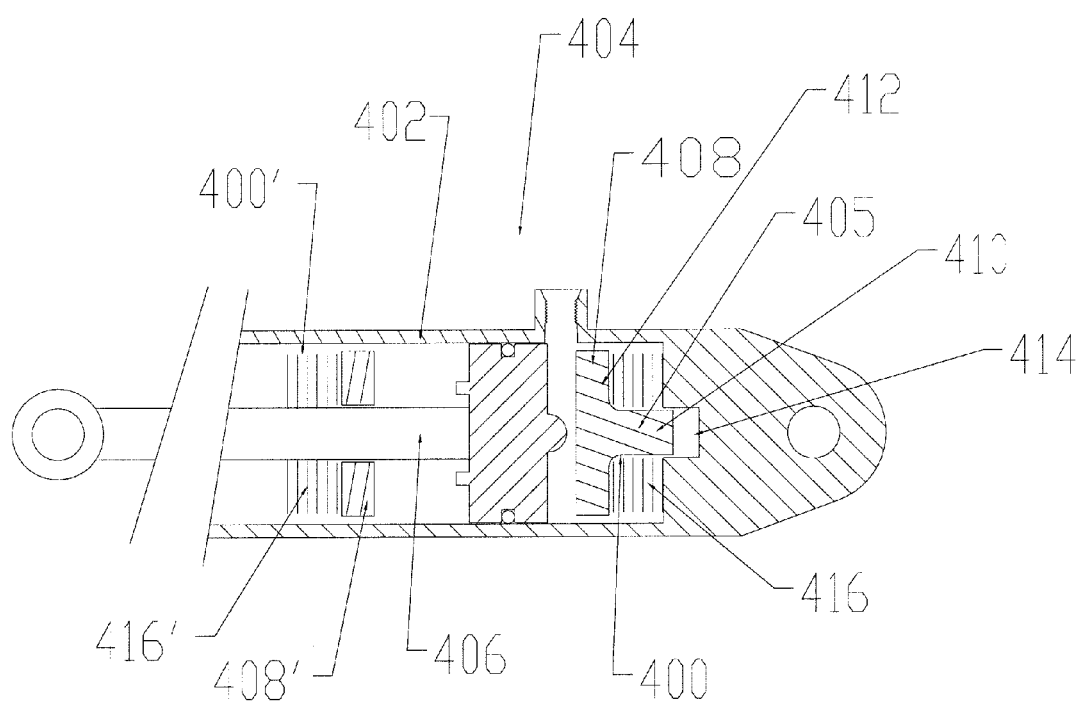
FIG. 8 is a schematic cross-section view illustrating a hydraulic cylinder end stop embodiment of the present invention.

As shown in FIG. 8, the damping units 10, 100 or 200 could also be used as hydraulic cylinder end-stop cushions. For instance, a damping unit 400 can be mounted inside the cylinder 402 of a hydraulic cylinder and piston arrangement 404 to cushion the linear motion of a ram 406. The damping unit 400 may comprise a plunger-like member 405 having a head portion 408 and a shaft portion 410 extending perpendicularly from a working face 412 of the head portion 408. The distal end of the shaft portion 410 is axially guided in a bore or recess 414 defined in the end wall of the cylinder 402. A set of damping plates 416 is freely mounted on the shaft portion 410 of the plunger-like member 405. The axial gaps between the plates 416 are filled by the hydraulic fluid used to actuate the cylinder 402. The diameter of the head portion 408 of the plunger-like member 405 and that of the plates 416 are generally smaller than the inner diameter of the cylinder 402. When the ram 406 reaches the end of its stroke, it axially pushes against the head portion 408 of the plunger-like member 405, thereby axially displacing the head portion 408 to bear force onto the plate stack. The action of the working face 412 of the head portion 408 of the plunger-like member 405 causes the pack of plates 416 to collapse, thereby squeezing out the oil from between the plates, as described herein before. Cushioning could also be provided at the end of the return stroke by mounting a second unit 400' onto the rod-end of the ram, as shown in FIG. 8. The second unit 400' may comprise an annular flange 408' fixedly mounted on the rod-end of the ram 406 and a stack of plates 416' freely mounted on the rod-end of the ram 406 between the annular flange 408' and the end wall of the cylinder 402.

The above arrangement provides an interesting alternative to the current practice which typically consists of providing a tapered plug onto the end of the ram for engagement in a hole of close fitting tolerances in the end cap of the cylinder to provide hydraulic pumping through a braking orifice. To move the ram out of the cushion of this form requires a machined port with a flow check valve allowing oil back into the space behind the tapered plug, as the plug recedes. The advantages of the above proposed alternative comprise: simplicity, reduced machining, elimination of the required breakaway retraction force typical to lifting the flow check off of its seat, reduced mechanical size requirements, and improved damping at varying loads and velocities due to the self-compensating nature of the illustrated embodiment.

Figure 9:
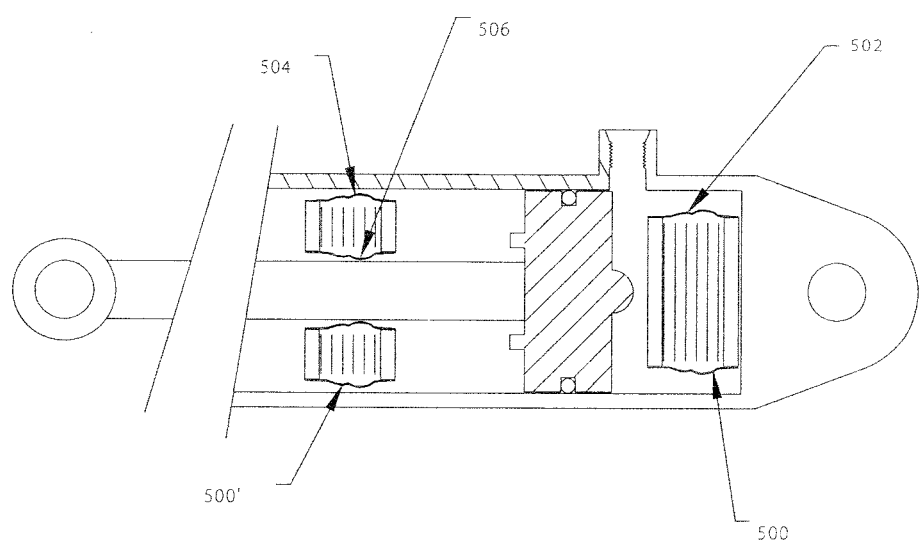
FIG. 9 is a schematic air cylinder end stop embodiment of the present invention.

As shown in FIG. 9, the cylinder end-stop variant could be adapted to air cylinders as well. In adapting the cushion or damping unit 500 to air cylinders, an elastomeric envelope 502 would be provided to contain the working fluid. For instance, a unit similar to the unit shown in FIG. 1 could be used. The rod-end unit or return stroke unit 500' would comprise an elastomeric seal to both the outside periphery 504 and the inside periphery 506 of the hole in the stack of plates.

Figure 10:
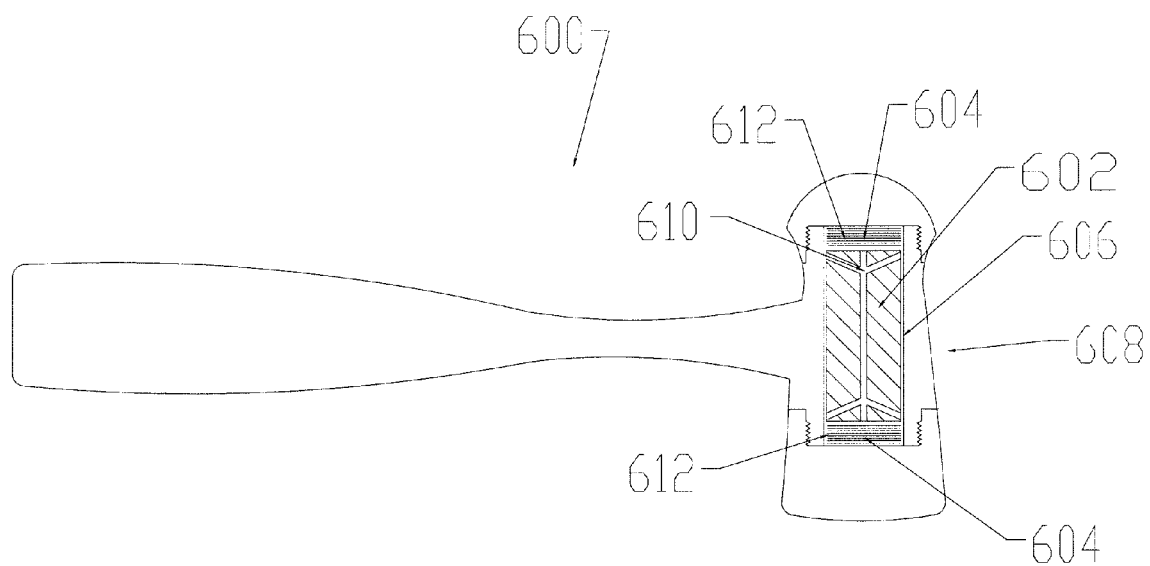
FIG. 10 is a dead blow hammer head embodiment of the present invention.

FIG. 10 illustrates one possible dead-blow hammer application. The hammer 600 has a hammer head 608 comprising a mass 602 mounted between two hydraulic damping units 604 inside a cylindrical tube 606 and retained captive therein by any appropriate means, such caps threadably mounted to oppose ends of the tube 606. An internal passage 610 allows the exchange of the displaced working fluid upon the collapsing of the plate packs 612 of the units 604 to the opposite end of the acting/solicited damping unit. The damping units 604 could, for instance, take the form of any one of the embodiments shown in FIGS. 1 to 5. It is also understood that the specific assembly configuration shown in FIG. 10 is for illustrative purposes only and that there are many other suitable ways to incorporate a hydraulic cushion or unit into a hammer head.

Figure 11:
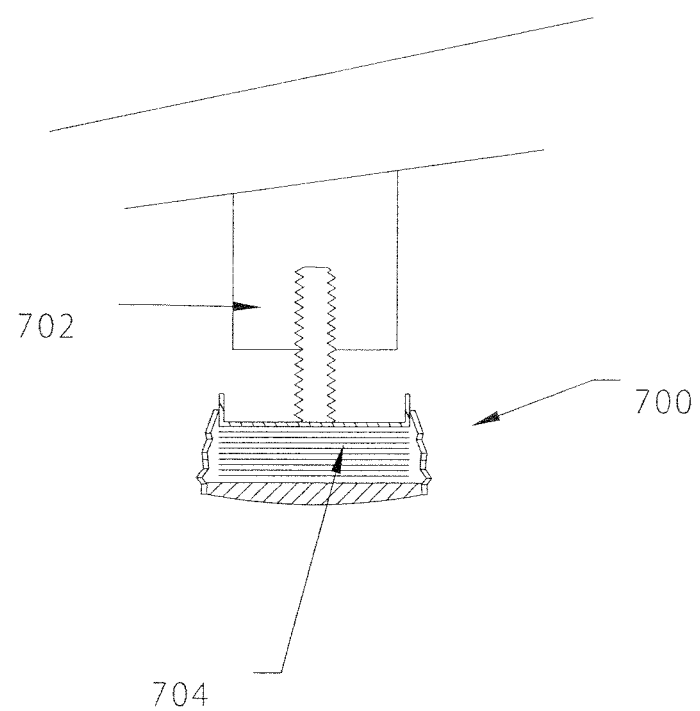
FIG. 11 is a table and chair anti-wobble embodiment of the present invention.

As exemplified in FIG. 11, the mounting of a hydraulic cushion or unit 700 to the bottom end of each leg 702 of furniture, and mostly to those of chairs and tables would provide instantaneous intervention-free self-adjustment of the object to minor localized varying floor levels, as are commonly found on tiled flooring surfaces. Each unit 700 could, for instance, be of the type shown in FIGS. 1 to 3. The inherent spring force produced by the distorted plates 704 of the type shown in FIGS. 3b and 3c would produce a reaction force which would be tuned to a value less than the normal unloaded object weight, and upon being placed or moved to a floor location which was uneven, would cause the least loaded leg cushion 700 to extend by virtue of the reduced load, or the most loaded leg cushion 700 to compress by virtue of the higher load. If an occupant shifted the load, say on the corner of a table, the two legs, generally diagonally opposite from each other with the higher load, would already have collapsed to their shortest distance, the third point, now under the elbow of the occupant, would collapse slowly, and avoid upsetting the table suddenly, and the fourth, now unloaded leg cushion would extend to take up the distance made available by the retreating leg. If the object load was to change again, or if the object was changed to a different position on the floor, a new balance would be established without rapid motion in the object being permitted.

According to another possible application, one or more force limiting devices, such as the one shown in FIG. 1, could be used as a self-adjusting vibration dampening machine base. For instance, force limiting devices 10 could be added to the bottom extremities of domestic appliances prone to vibrate, like the domestic clothes washing machine. Each force limiting devices could be force-tuned by the use of springs, or by the inherent spring force of the sprung plates, to the gravitational load normally exerted by the machine at rest. The spring rate would hold the cushion at rest in a partially collapsed state. The use of the devices would allow the machine to settle like the restaurant table, where the two opposite legs more highly loaded would collapse to their shortest distance, except that due to the force tuned internal or external springs, the devices or cushions would not bottom out at rest, but instead be held by the action of the spring at a collapse distance allowing further collapse if the force system was increased dynamically by the function of the machine.

A good example of use would be the spin cycle of the clothes washing machine. At rest, the cushions would settle to provide quasi-even force on each leg, regardless of minor localized level discrepancies of the floor, by virtue of the spring action. Once the machine began to oscillate from operating, the shear friction of the oil being forced out of the plate interstices would dissipate the energy of the machine oscillations. Furthermore, the self-compensating characteristics of the dampening effect will auto-tune the force limiting device to the frequency of oscillation seen by the machine, and tend to limit the sympathetic resonance of the machine as it accelerates through the critical speed. Another aspect of the benefit of incorporating the device into the base of machines would be the attenuation and/or suppression of noise which would normally be transmitted to the floor; The floor acting as a radiating surface which converts the vibrations induced upon it by the machine, to sound waves in the space. Since the force limiting device auto-tunes to a wide range of frequencies, a substantial reduction in sound transmission can be achieved.

Figure 12:
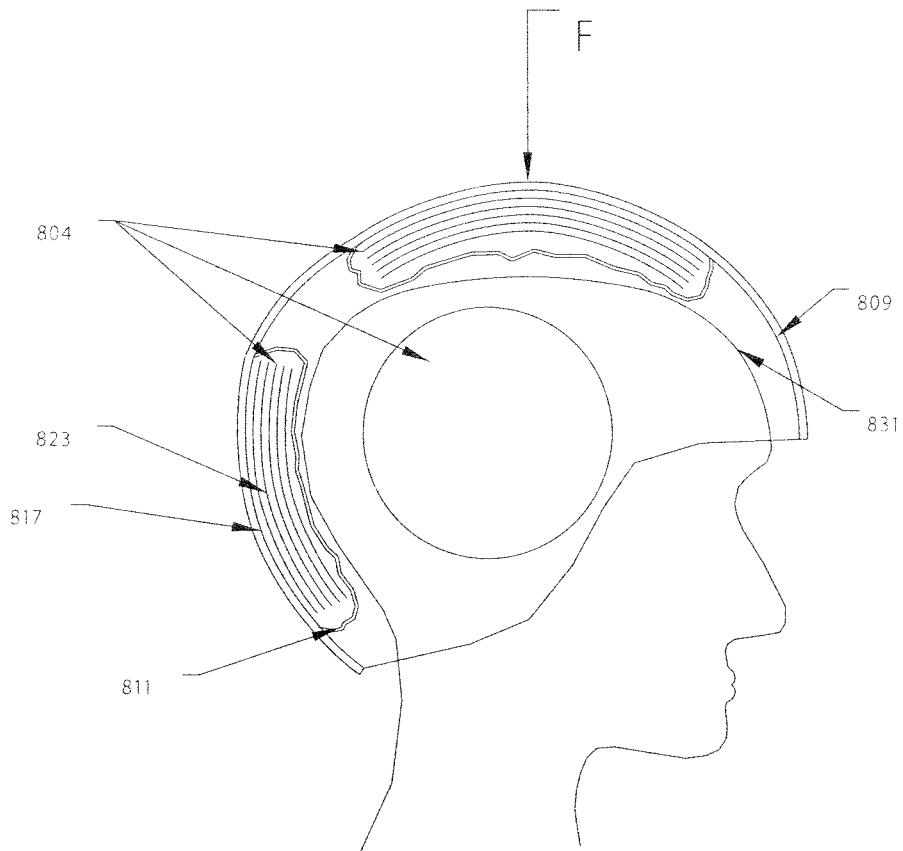
FIG. 12 shows a protective device having a plurality of shock absorbing members each including a stack of free floating piston plates individually acting on a film of fluid filling each gap between adjacent plates.

As shown in FIG. 12, the force limiting devices could also be configured to act as shock absorbing cushions in protective helmets, such as those used in practicing sports. Indeed, it may be possible to reduce physical harm to sport players by incorporating several cushions 804 into a helmet, as shown in FIG. 12. The incorporation of cushions 804 between the hard inner working surface 809 of the helmet and of the cranium 831 of the person wearing the helmet provides concussive protection to the head of the wearer. Each cushion 804 may comprise a hermetically sealed fluid filled bladder 811 mounted to surface 809 and containing a multitude of free floating plates 817, which may be made of flexible plastic material, interspersed with cloth sheets 823 of equal size. At rest, capillary action promotes the equal distribution of fluid throughout the thickness of the cushion by wicking into the cloth, and the cushion thickens to a point of hydraulic equilibrium between the cranium and the helmet. This characteristic of behavior would constitute a self-adjusting helmet, so that localized individual cranial variations of the wearer would be supported equally by the combination of the inner working surface of the helmet and the quasi-liquid state of the non-compressed cushion. When a concussive force F is applied by hitting anything with the helmet, the fluid which was contained between each plate would seek to escape laterally to the edge of the cushion. Since the cushion is self compensating by virtue of the increasing resistance as the cushion collapses versus the diminishing force applied typical to deceleration, the perceived peak force remains relatively constant but is extended over time, and is thus limited in intensity. This dynamic deceleration will help to reduce concussive forces applied to sports players, and thus limit immediate and long term trauma to the head.

As can be appreciated from the foregoing, the present invention is particularly suitable for attenuating any unidirectional or reversing load of great intensity and short duration. For instance, it could be used as entry cushions for load cells, where the collision of masses through load sensing instrumentation sets up large transient spikes, dangerous to the maximum operating limit of the load cells. It could also be advantageously used in linear acting machine requiring a rapid deceleration. Railway end-of-line bumpers made of this configuration would be useful in protecting the end-of-line bolster. It could also be used on machine bases or component mounts where the use of springs or elastomeric mounts to support the mass gives rise to deleterious base harmonic frequencies. By having a portion of the energy converted to heat, the settling time of the harmonic would be shortened. The use of frequency-tuned dampers in aerospace would aid in attenuating dangerous or problematic harmonics or peak-force transients.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A mechanical dampener comprising:
   a) a housing defining a hermetic chamber having an axis;
   b) first and second counter-acting members spaced apart along the axis and displaceable along the axis for receiving external compressive loads compressing the first and second counter-acting members towards one another;
   c) a working liquid contained within the chamber;
   d) a set of plates received in the chamber between the first and second counter-acting members and movable towards one another substantially along the axis under compression of the first and second counter-acting members, the set of plates having a resilient geometry forming a spring providing a resistance by an inherent spring force against compression of the first and second counter-acting members in the axial direction by separating the plates axially by at least one inter-plate gap to allow ingress of the working liquid, such that in response to a compressive load applied on the first and second counter-acting members that exhibits an input force exceeding the inherent spring force, the plates are movable towards one another to squeeze out at least a portion of the working liquid in the at least one inter-plate gap.

2. The mechanical dampener of claim 1, wherein the set of plates comprises a plurality of separate plates each of which is floatingly received within the working liquid in the chamber.

3. The mechanical dampener of claim 2, wherein the plurality of resilient bends comprises a plurality of creases in the separate plates.

4. The mechanical dampener of claim 2, wherein the plurality of separate plates comprises alternately disposed plates from among a first and second categories of plates, wherein the plates in the first category are substantially flat, and wherein the plates in the second category are bent.

5. The mechanical dampener of claim 1, wherein the housing comprises a resilient outer wall that is deformable under compression of the first and second counter-acting members.

6. The mechanical dampener of claim 5, wherein the resilient outer wall comprises an elastomeric boot that is deformable to accommodate working liquid squeezed out of the at least one interplate gap.

7. The mechanical dampener of claim 1, wherein the resilient geometry comprises a plurality of resilient bends.

8. The mechanical dampener of claim 1, wherein in the absence of an external compressive load, each of the at least one inter-plate gap is, at rest, 0.040 inches thick or less.

9. The mechanical dampener of claim 1, wherein in response to a compressive load applied on the first and second counter-acting members that exhibits an input force exceeding the inherent spring force, the plates are movable towards one another until they touch completely.

10. A hydraulic cushion comprising a chamber containing a working fluid, a force transmitting member axially reciprocable within the chamber, said force transmitting member having a working surface moving against fluid pressure in the chamber, and a stack of damping plates floatingly mounted in the chamber between the working surface of the working member and an axially opposed reaction surface of the chamber, the damping plates being axially movable towards and away from each other but restrain from movement in parallel planes, at rest, the damping plates being spaced-apart by inter-plate gaps, said inter-plate gaps being occupied by the working fluid, the damping plates exhibiting a spring effect having an inherent spring force separating the damping plates to allow ingress of the working fluid, the working fluid being squeezed out from between the plates as the force transmitting member travels towards the stack of plates under the application of an external load exceeding the spring force forcing the plates closer together until plates touch one another, thereby causing axial collapsing of the stack of plates.

* * * * *